April 3, 1945.   R. P. DEWEY   2,372,662
PORTABLE HARDNESS TESTING INSTRUMENT
Filed April 2, 1942   2 Sheets-Sheet 1
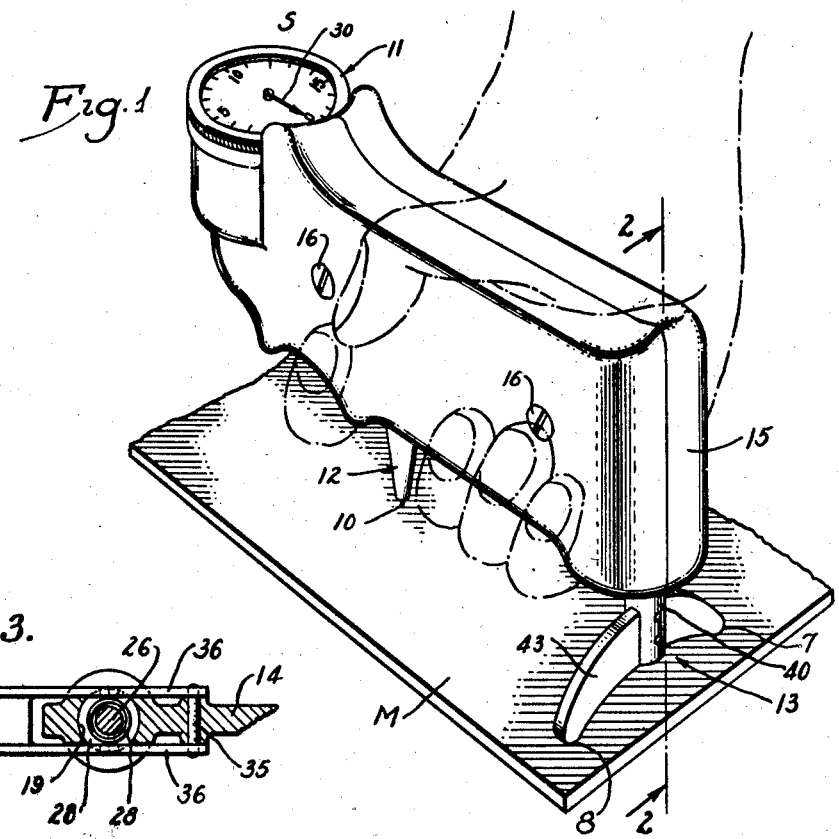
Ritchie P. Dewey INVENTOR.
BY Parker, Carlson, Pitzner & Hubbard
ATTORNEYS April 3, 1945.  R. P. DEWEY  2,372,662
PORTABLE HARDNESS TESTING INSTRUMENT
Filed April 2, 1942  2 Sheets-Sheet 2
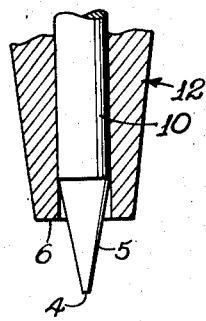
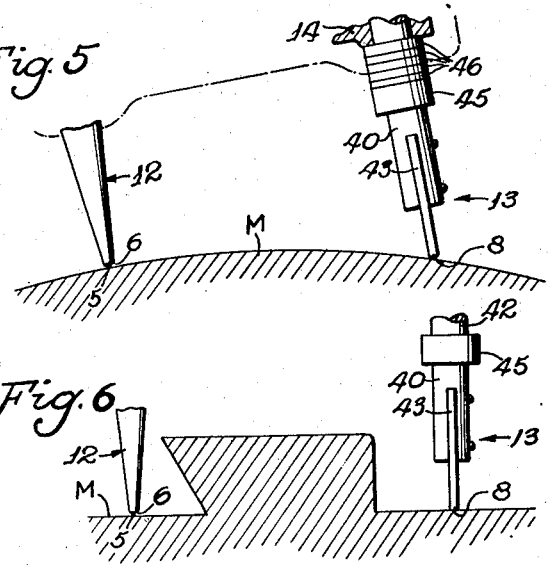
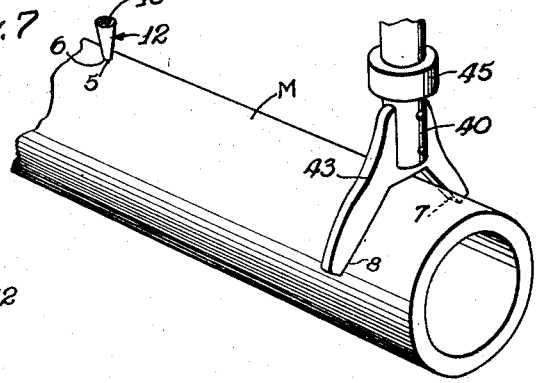
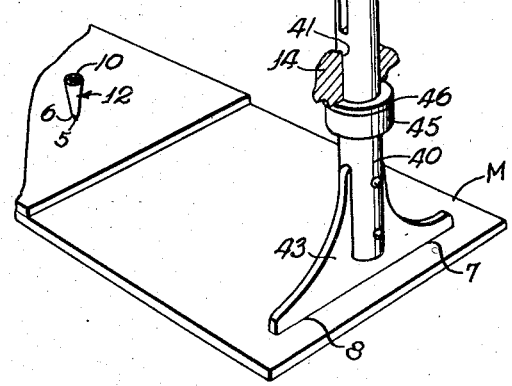
INVENTOR
Ritchie P. Dewey
By Parker, Carlson, Pitzner Hubbard
ATTORNEYS Patented Apr. 3, 1945

2,372,662

UNITED STATES PATENT OFFICE 2,372,662

PORTABLE HARDNESS TESTING INSTRUMENT

Ritchie P. Dewey, Rockford, Ill., assignor to Barber-Colman Company, Rockford, Ill., a corporation of Illinois Application April 2, 1942, Serial No. 437,328

7 Claims. (Cl. 73—81)

The invention relates to a portable instrument for determining the hardness of solid bodies and more particularly to instruments of the type which measure the depth of penetration of a point pressed into the work under a predetermined pressure.

The general object is to provide a hardness tester which may be grasped and held conveniently in one hand, which requires only the application of hand pressure in testing soft metals and the like, and which is relatively inexpensive to manufacture yet is reliable and accurate in operation.

Another object is to provide a hardness tester which may be applied to rough or irregular surfaces, surfaces of small area or surfaces within grooves, close to shoulders or in other locations difficult of access.

Still another object is to provide for approach to the work and penetration of the latter by the indentor point at a constant angle irrespective of the surface contour of the work.

A further object is to provide a hardness tester adapted to be gripped in one hand and having an indicator capable of being read conveniently while the instrument is pressed against the work.

The invention also resides in the novel construction and arrangement of the instrument body, the supporting parts therefor, and to the manner of mounting the penetrating point to enable the foregoing objects to be attained.

Other objects and advantages of the invention will become apparent from the following detailed description of the preferred embodiment illustrated in the accompanying drawings, in which Figure 1 is a perspective view of a portable hardness testing instrument embodying the features of the invention.

Fig. 2 is a longitudinal sectional view of the instrument taken in a vertical plane substantially on the line 2—2 of Fig. 1.

Fig. 3 is a fragmentary sectional view of the instrument taken along the line 3—3 of Fig. 2.

Fig. 4 is an enlarged view partly in section, showing the position of the indentor element or point with respect to a piece of material under test.

Figs. 5 and 6 are fragmentary cross-sectional views and Figs. 7 and 8 are fragmentary perspective views illustrating special applications of the tester.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

The drawings show the improved instrument in a form particularly suited for testing soft metals such as aluminum, plastics, and other similar materials. Most of the operating parts are arranged compactly in a body 9 adapted to be grasped and held in the user's hand and pressed manually against the surface M of the material to be tested. The instrument includes a pointed indentor element or plunger 10 movably mounted on the body and arranged to be forced into the surface of the material by application thereto of a predetermined pressure capable of being created by manual effort, fifteen pounds being the approximate pressure employed when the instrument is to be applied to the soft metals. The degree of hardness of the material is determined by the depth of penetration of the plunger from a predetermined or zero position as indicated by a dial type indicator 11 suitably connected with the point and mounted on the instrument for convenient visual inspection.

To enable the instrument to be applied to other than flat surfaces and to insure that the indentor point 5 will always approach and enter the work at the same angle, the body is adapted to be held spaced from the work surface and supported rigidly against wobbling. This is accomplished by a three point support comprising projections or feet 12 and 13 depending rigidly from the under side of the body and providing lower end bearing or abutment surfaces 6, 7, and 8 of small area which contact the surface M at points spaced both longitudinally and transversely of the body 9 and located on opposite sides of the line of hand pressure applied to the tool, one of the abutments being disposed immediately adjacent and preferably coincident with the indentor point 10.

Preferably, the body 15 is elongated in a direction parallel to the work surface M and in this instance comprises a rigid frame member 14 enclosed in a shell or casing 15 preferably made in sections removably secured together as by bolts 16. The body 9 is rigid and shaped so that it may be encircled substantially by the user's hand with the fingers extending beneath the body and upwardly along one side as shown in Fig. 1. The palm of the hand contacts the opposite side of the body and the thenar, that is, that portion of the palm at the base of the thumb, bears on the top. The body is thus held firmly and when pressed downwardly to bring the projecting abutments 6, 7, and 8 into full contact with the surface M, the resultant vertical line of the hand pressure is between the projections 12 and 13.

The indentor plunger 10 is slidably supported for movement toward and from the surface of the material to be tested with its axis substantially perpendicular to the longitudinal axis of the instrument body. As herein shown, the support for the plunger is provided by the projection 12 which surrounds and forms a guide for the plunger. For this purpose, the projection comprises a tube having an enlarged upper end 18 screw threaded into the lower end of a bore 19 formed in the frame block 14 with its axis spaced forwardly from the longitudinal center of the body. The projecting portion of the member 12 tapers gradually toward its end which defines the flat bearing surface 6, the latter being concentric with the point 10 and of narrow radial width so that it bears against only a small area of the work surface. The plunger 10 comprises a cylindrical pin and is guided almost to the end of the projection 12 in the lower portion of a stepped axial bore 17. The upper portion of this bore guides a cylindrical head 21 on the upper end of the plunger which head is engageable with a shoulder 22 to prevent the plunger from sliding out of the bore.

The plunger point is frusto-conical in shape having an included angle of about 25 degrees and a flattened end surface 4 approximately .005 of an inch in diameter. A point of this contour will penetrate plastics and softer metals such as aluminum, its alloys, copper, brass, etc., under an axial pressure of about fifteen pounds, the depth of penetration being inversely proportional to the hardness.

The plunger 10 is urged outwardly with predetermined pressure by a spring 25 acting a pin 26 slidably supported at one end in the bore 17 and at the other end in an axially alined aperture in a plug 27 threaded into the upper end of the passage 19. The spring is interposed between the lower end of the plug and a peripheral flange 28 formed on the pin, said flange engaging the inner end of the projection 12 when shifted to its limit position under the influence of the spring. When the plunger 10 is pressed upwardly against the pin with the latter in its lowermost or limit position, the point projects 3/64 of an inch beyond the abutment surface 6 of the projection 12.

In testing a piece of material such as a flat metal sheet M, the projection 12 is pressed against the work surface with sufficient force to cause the plunger to overcome the spring 25 and move upwardly from its normal or zero position a distance which is determined by the hardness of the work material and the adjustment of the spring. Thus, for very soft materials, the tip 5 will penetrate the work a substantial distance under the spring pressure and the upward motion of the plunger will be correspondingly small. With harder materials, there will be less penetration and a correspondingly greater movement of the plunger incident to pressing the projection 12 against the work.

In the exemplary instrument, the pressure exerted on the plunger by the spring 25 can be adjusted as required for different types of material by screwing the plug 27 into or out of the passage 19. Such adjustments are usually most conveniently made with reference to a known standard, that is, the instrument is applied to a piece of material of known hardness and the spring tension is suitably adjusted to provide the desired reading of the indicator 11. It will be understood, of course, that the adjustments are made only when the instrument is calibrated and thereafter the setting is maintained without further change.

In order to provide a quick and accurate indication of the depth of penetration of the plunger 10 into the material under test, the indicator 11 is arranged to respond directly to the upward movements of the plunger and the associated actuating pin 26. In the instrument shown, the indicator is a conventional dial type gauge which may be graduated in thousandths of an inch or in arbitrary units of hardness as desired. The indicator has the usual pointer 30 (Fig. 1) rotated relative to a suitable scale S in response to movements of a vertical pin 31 (Fig. 2) projecting from the underside of the indicator.

For the convenience of the operator, the indicator is mounted in a horizontal position at the front end of the casing as shown in Figs. 1 and 2 where it can be easily seen while the instrument is being pressed against the material under test. A split ring 32 clamped around the body of the indicator and secured to the forward end of the frame 14 as by a bolt 33 holds the indicator firmly in place with the lower end of the pin 31 in substantially the same plane as the flange 28 of the plunger actuating pin. Moreover, the pin is alined in substantially parallel relationship to the actuating pin 26 and plunger so that it can accurately conform to the movements of those elements.

Movements of the plunger and actuating pin are transmitted to the pin 31 through an amplifying leverage mechanism comprising, in this instance, a lever 34 pivotally supported at one end on the frame 14 as by a pin 35 and having its free end underlying the pin 31. The lever is preferably formed from a flat metal strip one end of which is bifurcated to define two parallel side members 36 which are bent up at right angles to straddle the pin 26 as shown in Fig. 3. These side members receive the pivot pin 35 while the flat end portion projects under the indicator shaft. As will be seen by reference to Fig. 2, each of the side members is formed on its lower edge with a knife edged lug 37 adapted to rest on the flange 28 of the plunger actuating pin. The arrangement is such that the movement of the pin through its full range of travel, that is, 3/64 of an inch is just sufficient to move the pointer 30 completely around the scale S.

Thus, the indicator actuator has a definite zero or normal position determined by engagement of the flange 28 with the upper end 18ᵃ of the enlarged tube end 18. In this position of the pin 26, the indicator pointer will be in the zero position. Then, by pressing the instrument against a substance too hard to be penetrated by the point 5, the pointer 30 will turn through one full revolution and again be positioned at zero. This affords a convenient way of checking the condition of the point to determine whether it has been broken off or damaged. The extent of projection of the plunger beyond the abutment 6 as determined by the hardness of the material to which the instrument is applied will determine the angular position of the pointer 30. The indicator thus reads in terms of the material hardness.

In order to obtain uniform accurate readings, the plunger should always engage the material to be tested at the same angle, preferably with its longitudinal axis substantially perpendicular to the surface of the material. Moreover, any vibration or wobbling of the instrument while the latter is pressed against the work will affect the accuracy of the measurement. Such vibration is prevented and the plunger is effectually guided in its approach to the material by the bearing member or rest 13 which, in cooperation with the projection 12, provides a three point bearing support for the instrument on the surface of the material.

The member 13 as herein shown comprises a pin 40 adapted to be received snugly in a vertical bore 41 adjacent the rear end of the frame 14. The upper end of the shaft is bifurcated to form opposed prongs 42 which may be sprung outwardly to frictionally engage the walls of the aperture and thus removably hold the shaft in assembled relation with the instrument frame. Rigidly secured to the projecting end of the pin is a transversely disposed foot 43 in the form of an elongated plate which may have its lower edge portion shaped as shown in Fig. 1 to provide the two surface engaging areas 7 and 8 spaced transversely of the body 9 and longitudinally from the projection 12. A pin 44 projecting into the aperture 41 between the prongs 42 serves to locate the foot in substantially perpendicular relation to the common axial plane of the projection 12 and shaft 40. A collar 45 rigid with the shaft seats against the bottom of the frame 14 to hold the foot in fixed relation to the frame, this relationship being such that the bearing surface 6 of the member 12 and the surface engaging areas 7 and 8 of the foot 43 lie in the same plane substantially parallel to the longitudinal axis of the instrument body.

The spacing of the three bearing surfaces or contact areas 6, 7, and 8 effectually prevents wobbling of the instrument either laterally or longitudinally as it is applied to the material under test. Moreover, the arrangement of the foot 43 at the rear end of the instrument with the contact areas spaced laterally thereof provides a convenient means for guiding the plunger in its approach to the surface of the material. For example, in operating the instrument, the casing is gripped in the hand in the manner shown in Fig. 1 but with the front end tilted upwardly at a slight angle and the foot 43 is firmly pressed against the surface of the material to be tested. The entire instrument is then rocked forwardly about the points 7 and 8 as a fulcrum until the surface 6 comes into full contact with the surface of the material. Under these conditions, the plunger 10 is forced inwardly against the action of the spring 25 varying distances depending upon the hardness of the material.

When the instrument is applied to extremely hard material, the plunger may be forced to its inner limit position in which case the indicator pointer is moved through its full stroke to give a maximum indication. On the other hand, with relatively soft material, the pressure of the spring 25 may be effective to push the plunger outwardly through its maximum stroke which will be appropriately indicated by the movement of the pointer 30 to the other extreme position. For material having a degree of hardness intermediate the above limits, the depth of penetration will vary with the hardness. This may be quickly and accurately read on the indicator, which as stated hereinbefore, may be calibrated to read directly in units of hardness if desired.

For use on work of rough or irregular contour, it is desirable to shape the bottom of the foot 43 as shown in Fig. 1 so that the points 7 and 8 will be of comparatively small area and disposed on opposite sides of the central plane. However, where the work surface contacted is flat or substantially so, the bottom of the foot may be flat as shown in Fig. 8. Or to adapt the instrument for use on pipes or the like, the foot may be forked or otherwise contoured to fit the work surface. If desired, separate feet of different contours may be provided and used interchangeably in the instrument depending on the character of the work to be tested.

It may be desirable at times to apply the instrument to surfaces in which the particular area to be tested is located in a different plane from the area against which the contact areas of the foot 43 must be rested. In order to maintain the perpendicular relationship between the plunger and the surface under these conditions, the spacing of the foot from the instrument body may be adjusted by insertion of one or more washers 46 (Fig. 1) between the collar 45 and the bottom surface of the frame 14. The removable mounting of the pin 40 permits this adjustment to be made with a minimum of difficulty.

It will be observed that when the instrument is applied to the work, the body 9 is rigidly supported and spaced from the work by the projections 12 and 13, the former being disposed immediately adjacent the indentor point. This not only facilitates gripping and holding of the instrument but also adds greatly to its versatility. Thus, a three point support and a constant approach angle are obtained and the point is always free to penetrate the work to the full depth determined by its zero position. This relation always obtains irrespective of minor irregularities in the work surface. By mounting the point coincident one of the abutments, and by making the latter of comparatively small area, the projection 12 may be disposed close to a shoulder as illustrated in Fig. 6 or may contact the bottom of a groove with a raised portion of the work disposed between the projections 12 and 13. For the same reasons, the hardness of convex or otherwise uneven surfaces may be measurd as illustrated in Fig. 5, in which case the foot 13 is lengthened so that the point 5 enters at right angles to the work surface.

The instrument above described is especially useful in measuring the hardness of fabricated structures and those which cannot be moved conveniently. This is because it may be grasped and held in one hand and because the point 5 is so shaped that it will penetrate a substantial distance into the softer metals, plastics, etc., under a spring pressure which may be overcome by the relatively small force capable of being exerted conveniently by hand to bring the abutment 6 against the work. Such substantial penetration is the result of making the tip 5 quite sharp as shown, so sharp in fact that it will enter the work under the spring effect a distance sufficient to prevent the point from being shifted laterally along the work.

This application is a continuation in part of my co-pending application, Serial No. 378,167, filed February 10, 1941.

I claim as my invention:

1. A portable hardness testing instrument comprising, in combination, an elongated body, a bearing member projecting from the underside of the body adjacent one end thereof including a foot having contact areas spaced apart transversely of the axis of the body and engageable with the surface of the material to be tested to provide a fulcrum about which the body may be rocked, a second bearing member projecting from the underside of the instrument body intermediate the ends of the body, the outer end of said second member engaging the surface of the material when the body of the instrument is rocked into substantially parallel relationship to the surface thereof, a plunger slidably supported by said second member for movement toward and from the surface of the material, spring means exerting a predetermined pressure on said plunger urging the tip of the plunger into the material to a depth dependent upon the hardness of the material, an indicator supported at the forward end of the instrument body for convenient visual observation when the instrument is held in the hand, and means operatively connecting said plunger with said indicator for indicating the depth of penetration of the plunger.

2. A portable hardness testing instrument comprising, in combination, an elongated body having its intermediate portion shaped to be gripped in the palm of one hand, a plurality of laterally spaced projections rigid with and extending from said body and engageable with spaced portions of the surface of a piece of material to be tested, an indentor element disposed closely adjacent and projecting beyond the plane of the end of one of said projections and movable relative to said body, said projections, when in full contact with the work surface, acting to insure a predetermined relationship between the indentor element and the work surface during entry of the element, spring means acting on said indentor element and operating to force the tip of the element into the work surface incident to the pressing of the projections against the same, and an indicator mounted on the forward end of said body for convenient observation while the body is held in one hand and operatively connected to said indentor element to indicate the depth of penetration of the element.

3. A portable hardness testing instrument comprising, in combination, a body shaped to be gripped by one hand of the user with the fingers extending beneath the body and with one portion of the palm of said hand contacting one side of the body and the remaining portion at the base of the thumb engaging the top of the body, members rigid with and projecting downwardly from said body and spaced apart so as to be disposed on opposite sides of the fingers gripping said body, said members being brought into contact with the work by the application of pressure by said hand along a line disposed between said members, an indentor point yieldably urged downwardly and movable upwardly relative to said body and members as an incident to pressing the latter against the work, and mechanism carried by said body and operatively connected to said indentor point, said mechanism including an indicator for registering the extent of such relative movement.

4. A portable hardness testing instrument comprising, in combination, a body shaped to be gripped by one hand of the user with the palm of said hand contacting one side of the body and the fingers extending beneath the body, members rigid with and spaced apart longitudinally of said body and extending downwardly from the body, said members being brought into contact with the work by the application of hand pressure in a downward direction and being of a length such as to permit of extension of the fingers of the user's hand between the body and the work, an indentor point yieldably urged downwardly so as to penetrate the work surface and be moved upwardly relative to said body and members as an incident to pressing the latter against the work, and mechanism carried by said body and operatively connected to said indentor point, said mechanism including an indicator for registering the extent of such relative movement and penetration.

5. A portable hardness testing instrument comprising, in combination, a body shaped to be gripped by one hand of the user and to be pressed manually against a work surface, a projection rigid with and extending downwardly from said body for bearing engagement with a work surface, an indentor point slidably guided in and laterally supported by said projection adjacent the end of the latter and yieldably urged downwardly beyond said end so as to penetrate the work when the projection is pressed against the latter, a second projection rigid with and projecting downwardly from said body and spaced from said first mentioned projection to provide a space intervening between the two projections, said second projection being adapted when pressed against the work to define an axis about which said body may be rocked toward the work to bring the other projection into contact therewith and cause said indentor point to enter the work at a predetermined angle, and mechanism carried by said body and operatively connected to said indentor point, said mechanism including an indicator for registering the extent of such relative movement.

6. A portable hardness measuring instrument having, in combination, a hollow casing adapted to be grasped in and partially encircled by one hand whereby to be pressed bodily toward a work surface by hand pressure, means rigid with and projecting from said casing near one end thereof providing two abutments engageable with a work surface and defining an axis about which the other end of the casing may be rocked toward the work, a projection spaced from said abutments toward the other end of the casing and extending rigidly from the casing to provide an abutment engageable with a small area of the work whereby said three abutments support said casing rigidly from the work, a plunger guided for endwise movement by said projection and extending beyond said third abutment, means within said casing urging said plunger outwardly to a predetermined position with a predetermined force of a magnitude capable of being overcome by the application of hand pressure to said casing, an indentor point on the projecting end of said plunger adapted to penetrate soft metals under said force, and an indicator carried by said casing and actuated by movement of said plunger, said indicator having a movable element adapted to occupy a zero position when said plunger is in said predetermined position and movable away from said position a distance determined by the amount that said indentor point penetrates the work when all of said abutments are in contact with the latter.

7. A portable hardness measuring instrument comprising, in combination, a body, an indentor point projecting from the body to engage a work surface and yieldably urged away from the body, a plurality of projections rigid with and extending from one side of said body and adapted to bear against said work surface at laterally spaced points so as to support the body rigidly from the work surface in spite of uneveness in the contour thereof, one of said bearing points being of small area and surrounding said indentor point immediately adjacent the latter so as to be capable of full contact with a work surface at the bottoms of narrow slots, close to shoulders, etc., and indicating means connected to said point and operable to register the depth of work penetrated by said point when the body is pressed toward the work surface and supported through said bearing points.

RITCHIE P. DEWEY.